G. W. BULLEY.
CONTROLLER LOCK FOR VEHICLES.
APPLICATION FILED FEB. 11, 1915.
1,168,248.
Patented Jan. 11, 1916.
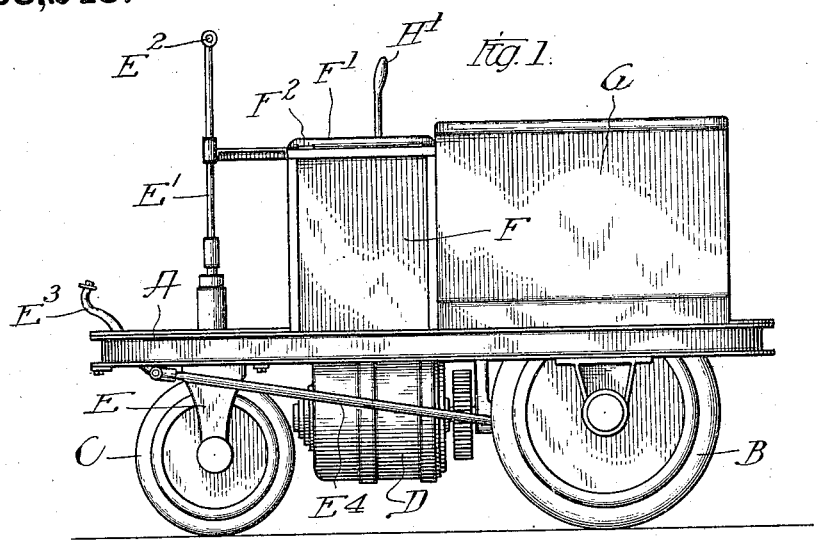
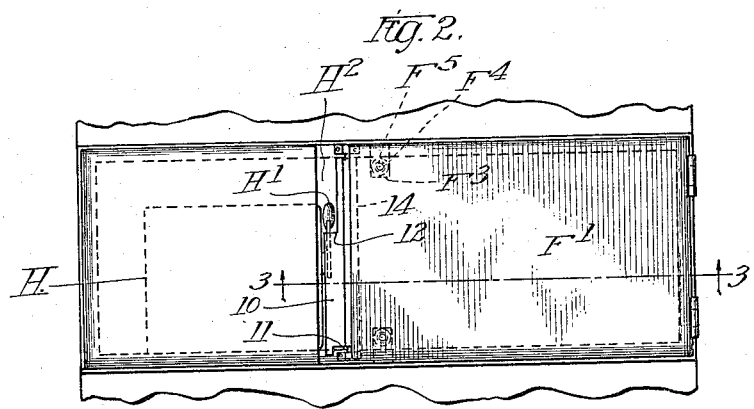
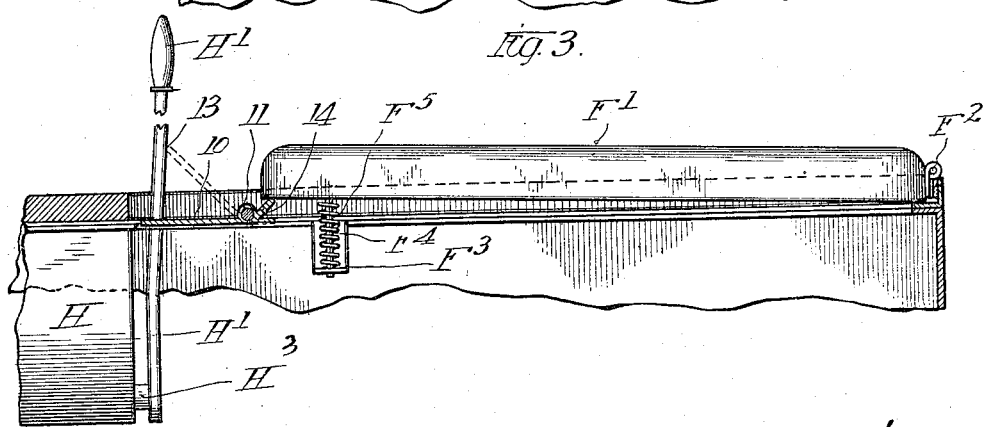

UNITED STATES PATENT OFFICE.

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

CONTROLLER-LOCK FOR VEHICLES.

1,168,248.  Specification of Letters Patent.  Patented Jan. 11, 1916.

Application filed February 11, 1915. Serial No. 7,495.

*To all whom it may concern:*

Be it known that I, GEORGE W. BULLEY, a citizen of the United States of America, and resident of Chicago, Cook county, Illinois, have invented a certain new and useful Improvement in Controller-Locks for Vehicles, of which the following is a specification.

My invention relates to improvements in means for locking the controlling apparatus of vehicles so that the controller cannot be manipulated except under the proper conditions.

One of the objects of my invention is to provide an improved device of this character which will be simple, durable and reliable in construction, and effective and efficient in operation.

Other objects of my invention will appear hereinafter.

Referring to the accompanying drawings—Figure 1 is a view in elevation of a vehicle illustrating one embodiment of my invention. Fig. 2 is a top plan view of the seat of said vehicle and the controller showing said locking members. Fig. 3 is an enlarged sectional view on the line 3—3 of Fig. 2.

It will be obvious to one skilled in the art, after having obtained an understanding of my invention from the disclosures herein made, that my invention is capable of modification and reconstruction without departing from the spirit and scope of the invention.

In the drawings, I have shown my invention as applied to a vehicle such as a tractor of the electrically portable type. In this structure the vehicle is shown as being provided with a frame A supported by the rear driving wheels B and forward single wheel C. The rear wheels in this case are driven by a suitable motor D suspended, as shown in Fig. 1, from the frame of the vehicle. The forward wheel C is carried in a suitable steering frame E, rising from which is a steering post $E^1$ positioned above the frame and having a suitable handle $E^2$ at its upper end by which the operator may conveniently steer or guide the vehicle. At the forward end of the frame is a foot-brake lever $E^3$ which controls the brake mechanism (not shown) through the medium of a brake rod $E^4$. On the upper side of the frame, in this particular instance, is a box-like structure F which extends transversely of the frame and which constitutes a seat for the operator. It will, of course, be understood that any suitable structure for this purpose may be employed. This seat is positioned conveniently for the operator with respect to the steering post E and the brake $E^2$. On the rear of the frame is a box-like structure or other suitable inclosure G in which, if desired, a storage battery (not shown) may be carried, for the purpose of supplying electric current to the motor. Within the structure F, to one side thereof, is positioned a controller H by which the current from the battery to the motor is governed. This controller may be of any suitable or standard construction, and for convenience I position it within the box-like seat structure F so that its handle or operating lever $H^1$ projects through a suitable opening $H^2$ in the top of said structure F. In this particular form the operating lever swings about a point $H^3$, which is the operating shaft of the controller. In the present structure the normal or off position of this operating lever is substantially vertical and somewhat to the rear end of its slot or opening $H^2$, as shown in Fig. 2.

At the left of the controller lever $H^1$, the seat structure is provided with a cushion top $F^1$ for the operator, the controller lever and seat cushion being relatively positioned so that an operator sitting on the cushion may conveniently manipulate said controller lever. I arrange the parts so that the controller cannot be manipulated except under proper conditions, thus preventing an unauthorized person from operating the controlling lever, and in fact even preventing the operator from manipulating the controller until he is seated on the vehicle in position to properly control and operate the vehicle; and in this particular structure, the cushion or seat member $F^1$ is hinged preferably at $F^2$, this being the side farthest from the controller lever. The inner side,— that is, that side nearest the controller lever—is yieldingly mounted so that it will give to some extent when the weight of the operator is imposed upon the seat. In this case I simply provide, within the interior of the structure F, a pair of outstanding lugs or members $F^3$ which form suitable bearings for rods $F^4$ carried by the seat member $F^1$. Surrounding these rods, and positioned between the seat member and the lugs $F^3$, are springs $F^5$ which act upon the seat member to hold it normally in a slightly elevated or raised position, as clearly shown in Fig. 3. This side of the seat, however, will be depressed to some extent against the tension of said springs when the operator sits on the seat, and this movement is utilized to operate a locking member which guards the manipulation of the controller lever. In this case the locking member is in the form of a flat plate 10, which is preferably hinged at 11 on an axis parallel to the plane of movement of the controller lever. The locking plate is adapted to be swung about its hinge or pivot into or out of the path of the controller lever $H^1$, as shown by the full and dotted lines in Fig. 3. In its normal or locking position it lies substantially flush with the top wall or member of the structure F and occupies the slot $H^2$ in which the controller lever moves. At its rear end it has a shoulder 12 which, when the plate lies in normal position, lies directly in the path of the operating lever and forms an obstruction to the movement of said lever. This shoulder coincides with the off or normal position of the controller lever and prevents the operation thereof. When the plate is swung upwardly about its pivot until its side edge 13 clears the operating lever, as shown in dotted lines in Fig. 3, the operating lever will then be released and free to be operated. This unlocking action on the plate is controlled or brought about by the movement of the seat lever $F^1$, and in this case I provide the hinge side of the locking plate with a lip or tongue 14 which stands at an angle to the plane of the plate and is positioned to co-act with the inner side of the seat member $F^1$. Thus when the operator sits upon the seat and depresses it, the action of the seat member $F^1$ on the tongue 14 swings the plate about its pivot and releases the controller lever, and this locking plate will be held in said position until the seat is relieved of the operator's weight, whereupon the plate will again be restored to locking position. But it will be observed that even though the operator releases the seat of his weight, the locking plate cannot restore to normal unless the controller lever has been returned to its off or normal position, this being obvious since the edge 13 of the plate will rest against the controller lever when the action of the seat is removed, except at the off or normal position of said controller lever. In the present instance the locking plate 10 is restored by gravity, but any other restoring means may be employed. The seat, of course, will be again elevated by the springs $F^5$ when the operator's weight is removed therefrom.

What I claim as my invention is:

1. The combination of a vehicle, a controller having an operating lever, a seat for the vehicle, a locking plate normally in the path of said lever to prevent its operation, and means responsive to pressure on said seat for actuating said locking plate to release the controller lever.

2. The combination of a vehicle seat, a controller lever positioned adjacent said seat, a hinged plate normally in the path of said lever to prevent its manipulation and having means co-acting with said seat responsive to pressure upon the seat for swinging said plate out of the path of the lever.

3. In a structure of the class described, the combination with a movable controller operating lever, a hinged plate pivoted adjacent said lever and normally interposed in the path of movement of said lever to lock the lever against operation, an operator's seat, and an arm on said plate and operable by the seat when depressed to swing the plate out of the path of said lever and release the lever.

4. The combination of a controller operating lever operable in a vertical plane, a plate pivotally mounted adjacent the lever to swing into and out of the path of movement of the lever, a hinged seat member adjacent said lever, and an extension on said plate operable when the seat is depressed to swing the plate out of the path of movement of said operating lever.

5. The combination of a support having an opening therein, a controller mounted on said support and having an operating lever projecting above and movable in said opening, a plate hinged on said support adjacent the lever and normally covering said opening, an extension on said plate, and a seat member hinged on the support and adapted when depressed to engage said extension and swing the plate away from the opening to release the lever.

Signed by me at Chicago, Illinois, this 2nd day of Feby., 1915.

GEORGE W. BULLEY.

Witnesses:
  ALB. H. BITZER,
  JOHN W. DUNCAN.

Copies of this patent may be obtained for five cents each, by addressing the "Commissioner of Patents, Washington, D. C."